United States Patent [19]

Yamauchi et al.

[11] Patent Number: 4,710,427
[45] Date of Patent: * Dec. 1, 1987

[54] PROCESS FOR TREATING MAGNETIC METAL POWER

[75] Inventors: Yasuhisa Yamauchi; Masao Asano; Hideyuki Anzai; Yoshitaka Yasufuku, all of Hino, Japan

[73] Assignee: Konishiroku Photo Industry Co., Ltd., Tokyo, Japan

[*] Notice: The portion of the term of this patent subsequent to Dec. 31, 2002 has been disclaimed.

[21] Appl. No.: 731,126

[22] Filed: May 6, 1985

[30] Foreign Application Priority Data

May 17, 1984 [JP] Japan ................................ 59-98981

[51] Int. Cl.4 .......................................... G11B 5/706
[52] U.S. Cl. .................. 428/407; 252/62.54; 427/128; 427/131; 427/130; 428/403; 428/328; 428/329; 428/694; 428/900
[58] Field of Search .............. 428/328, 329, 407, 403, 428/694, 695, 900; 427/128, 131; 252/62.54; 360/134–136

[56] References Cited

U.S. PATENT DOCUMENTS

| 4,197,347 | 4/1980 | Ogawa | 428/328 |
| 4,529,661 | 7/1985 | Ninomiya | 428/328 |
| 4,540,627 | 9/1985 | Ishizaw | 428/328 |
| 4,562,117 | 12/1985 | Kikukawa | 428/900 |

Primary Examiner—Ellis P. Robinson
Attorney, Agent, or Firm—Bierman and Muserlian

[57] ABSTRACT

A magnetic recording medium is disclosed comprising a support and a magnetic layer comprising a magnetic metal powder which is pre-treated by a process comprising (a) treating the surface of said magnetic metal powder with a surfactant in an inert atmosphere.

(b) steeping said magnetic metal powder in an organic liquid, and (c) drying said magnetic metal powder in the presence of an oxidative gas.

17 Claims, 2 Drawing Figures

PROCESS FOR TREATING MAGNETIC METAL POWER

FIELD OF THE INVENTION

The present invention relates to a process for treating magnetic powder, particularly to a process for treating magnetic metal powder used for a magnetic recording medium such as a magnetic tape, a magnetic card, a magnetic disc and others.

BACKGROUND OF THE INVENTION

Recently, according to a tendency toward a high density and a high S/N ratio of magnetic materials, particularly of a recording medium for a video deck and a computer, the size of a particle of magnetic powder has become smaller. In terms of a surface area per unit weight, for example, a magnetic tape in a standard grade for a VHS mode or a β mode employs magnetic powder having BET surface area of 19~23 m$^2$/g class, a magnetic tape in a high grade class employs magnetic powder having BET surface area of 23~28 m$^2$/g and a magnetic tape in a super high grade class employs magnetic powder having BET surface area of 29~33 m$^2$/g class. Further, in the near future, magnetic powder in 35~70 m$^2$/g class is to be put on the market.

Generally, an S/N ratio of a magnetic recording medium is said to be proportional to a square root of the number of particles of magnetic substance in the recording material related to recording and playing back. Therefore, when magnetic powder in the same weight is coated, the magnetic substance having smaller particle size is more advantageous for the improvement of S/N ratio. However, the surface area of a particle becomes larger in inverse proportion to the square of a particle diameter, therefore, the dispersion of particles becomes difficult sharply as the particle diameter becomes smaller and the stability of dispersion deteriorates.

For the dispersion of magnetic powder, an amount of dispersing agent that is just enough to cover the surfaces of magnetic powder particles should normally be enough but actually, the amount is not enough for the satisfactory dispersion and stability. For this reason, the dispersing agent is considerably excessive amount is added. Dispersing agent not adsorbed to the magnetic metal powder is mixed with a binder in the coated film and then plasticizes the magnetic layer and disturbs the hardening of the binder, thus lowers sharply the mechanical strength, especially the Young's modulus of the magnetic layer. Recently, according to the recent tendency for the long-time-recording on a tape, there is a trend for thinning the total thickness of the tape by using a thin base film. However, since the stiffness of the tape is proportional to the cube of the tape thickness, the tendency for thinning the tape reduces sharply the stiffness of the tape, which deteriorates the running efficiency and the head-touch of a thin tape and finally leads to the deterioration of an S/N ratio. In order to keep the mechanical and physical properties of the thinned tape, especially to keep the stiffness of the thinned tape, there have been an adoption of ultra tensilized base film and a movement toward a high Young's modulus of a magnetic layer. Therefore, the drop in a Young's modulus of magnetic layer caused by excessive dispersing agent and other low molecular weight additives deteriorates sharply the mechnical and physical properties of a thin tape.

There have been disclosed various technologies which may disperse effectively and stably the magnetic powder without deteriorating the mechanical and physical properties of the magnetic layer. For example, Japanese Patent Publication Open to Public Inspection Nos. 94308/1979, 143894/1979 and 92103/1975 (hereinafter referred to as Japanese Patent O.P.I. Publication) disclose the technologies wherein the magnetic metal powder is pre-treated with phosphoric ester derivatives.

Further, Japanese Patent O.P.I Publication Nos. 134899/1976, 51703/1978, 7898/1978 and 46509/1979 disclose the technologies wherein the surface of the magnetic layer is covered by silicone oil.

Further, Japanese Patent O.P.I. Publication Nos. 108902/1975, 97738/1974, 33753/1976, 116114/1978 and 24000/1979 disclose the technologies wherein the surfaces of magnetic powder are treated with anionic surfactant. However, the technologies mentioned above are not considered to be effective for fine-particle magnetic powder, especially for magnetic powder with BET 35~40 m$^2$/g or more.

Further, Japanese Patent O.P.I. Publication Nos. 103403/1976, 33602/1972, 125169/1980, 73929/1980, 73930/1980, 42888/1982 and 1026/1982 disclose the technologies wherein the surfaces of magnetic powder are covered by oligomer or polymer each having a functional group that can be adsorbed to magnetic powder.

On the other hand, Japanese Patent O.P.I. Publication Nos. 23207/1975 and 22603/1975 disclose a copolymer as a processing agent for treating magnetic powder. This copolymer contains, as a unit, wherein a part of carboxyl group is changed to amide (—CONHR) and alkyl group (—R) therefrom gives a lipophilic property, thereby it is intended to enhance the compatibility of magnetic powder for the binder in kneading magnetic paints.

Recently, for the high-density recording, there have been proposed and put to practical use various technologies wherein magnetic metal powder which contains iron as its principal ingredient is employed. Magnetic metal powder is excellent in saturation magnetization and its coercive force is high and thereby its nature as a recording material is excellent. However, it has following two disadvantages because its surface activity is high.

(1) Anti-oxidization stability of magnetic metal powder in the air:

If magnetic metal powder is left alone in the air, its magnetic characteristic deteriorates gradually as its oxidization progresses and in the worst case, the spontaneous combustion may take place being caused by the external heat, shock and others.

(2) When magnetic metal powder are dispersed in the binder, the dispersion itself is difficult because of the high surface activity of the magnetic metal powder and in the worst case, even the gelation takes place.

For the above-mentioned reasons, there have been proposed some methods shown below from (1) to (5) as a method for stabilizing magnetic metal powder.

(1) A method for volatilizing the organic matter gradually after the magnetic metal powder are dipped in the organic solvent (Japanese Patent O.P.I. Publication Nos. 97738/1974 and 54998/1977)

(2) A method wherein magnetic metal powder and higher fatty acid salt are agitatedly mixed and thereby the film containing higher fatty acid group is formed on the surface of a particle (Japanese Patent O.P.I. Publication No. 97738/1974)

(3) A method for processing magnetic metal powder in the atmosphere wherein the oxygen pressure is adjusted (Japanese Patent O.P.I. Publication No. 7153/1971)

(4) A method wherein magnetic metal powder are dipped in an aqueous solution and then the surface of a particle thereof is compulsorily oxidized by an oxidizing agent ($KMnO_4$ and others) (Japanese Patent O.P.I. Publication Nos. 30707/1981 and 69859/1977)

(5) A method wherein magnetic metal powder are dipped in a solvent (water, organic matter) and then they undergo a bubbling treatment performed by oxygen-containing gas (Japanese Patent O.P.I. Publication Nos. 85054/1977 and 16601/1981)

However, aforesaid methods all have following disadvantages.

In the method (1), it is possible to overcome the disadvantage (1) mentioned above but it is not good on the point of dispersibility.

The method (2) is effective against above disadvantages (1) and (2) but its reaction is not uniform because metallic salts which are insoluble in organic solvent are used.

The method (3) is feasible on a laboratory basis but it is not feasible on a manufacturing basis and aforesaid disadvantage (2) will not be improved.

The method (4) is effective for the aforesaid disadvantage (1) but it is difficult to control the reaction and the magnetic characteristic deteriorates greatly because of the processing in the water system.

In the method (5), the bubbling with gas makes it difficult to obtain the uniform oxidization and it is difficult to control the product, thus the method is not sufficient on the point of aforesaid disadvantage (2).

SUMMARY OF THE INVENTION

An object of the present invention is to improve the dispersibility and stability of magnetic powder, particularly of magnetic metal powder and to provide a processing method that can minimize a change on standing for aforesaid improved dispersibility and stability.

Namely, the process for treating magnetic metal powder of the present invention is characterized in that it comprises a step of treating the surface of the magnetic metal powder by surfactant, a step of dipping aforesaid treated magnetic metal powder in the organic matter in a liquid form and a step of drying the magnetic metal powder after dipping under the contact to the oxidizing gas.

DETAILED DESCRIPTION OF EXAMPLES

Since the surface of the magnetic metal powder is treated by the surfactant in the process of the present invention, it is possible to enhance the dispersibility of the magnetic metal powder against the binder resin by making the surface of the magnetic metal powder hydrophobic fully by aforesaid surface treatment. Moreover, after the surface treatment, the magnetic metal powder is dipped in the liquid-form organic material and the treated surface of the magnetic metal powder having aforesaid surfactant sufficiently thereon is cleaned and thus aforesaid dispersibility is highly maintained. Furthermore, after the aforesaid dipping, the magnetic metal powder is dried under the contact to the oxidizing gas (e.g. air) and thereby the surface of the magnetic metal powder is oxidized to a certain extent. This oxidization effectively reduces the active site of iron and others on the surface of the magnetic metal powder and thereby said surface may be stabilized.

Incidentally, in the preferably embodiment of the present invention, the magnetic metal powder is dipped in the surfactant-containing solution under the inactive atmosphere, agitated for the surface treatment thereof, the decompression drying is then given thereto and after that the magnetic metal powder is dipped in the liquid-form organic material and stirred and then, under the contact thereof to the gas containing oxygen, the solvent is volatilized and thus the magnetic metal powder is dried.

As the magnetic metal powder to be used for the present invention, there are given Fe magnetic metal powder, Ni magnetic metal powder, Co magnetic metal powder and the magnetic metal powder whose principal ingredient is Fe, Ni or Co etc. such as Fe-Ni-Co alloy, Fe-Mn-Zn alloy, Fe-Ni-Zn alloy, Fe-Al alloy, Fe-Co-Ni-Cr alloy, Fe-Co-Ni-P alloy and Co-Ni alloy. As aforesaid surfactant that may be used, on the other hand, cation type surfactant such as alkylamine fatty acid salt or anion type surfactant such as the surfactant having carboxylic acid salt on its hydrophilic group, the surfactant having sulfonate or the surfactant having phosphoric ester salt, are given. Aforesaid 'salt' means the salt of ammonium, the salt of alkaline metal or of alkaline earth metal. As aforesaid surfactant, the one which is soluble in organic solvent such as aliphatic hydrocarbon, aromatic hydrocarbon, alcohol, ether or ketone etc. is preferable. Further, fatty acid which is not surfactant may also be used.

Concretely, as alkylamine fatty acid salt, the one represented by $(n=6\sim 20, m=6\sim 20)$ is given. A compound shown in aforesaid concrete example is usually available easily under the brand name 'Duomeen TDO' (Lion-Akzo Co.). As phosphoric ester salt, metallic salt of phosphoric ester espressed by general formula:

-continued (where, R is an alkyl group with a number of carbon of 8~30, an alkylphenyl group n is an integer of 0–10 and M means a metallic element such as Na or the like.) is given. For example,

(Higher alcohol phosphoric acid monoester di=sodium salt)

and (Higher alcohol phosphoric acid di-ester sodium salt)

are given. Further, phosphoric acid ester salt which is an addition product of following higher alcohol ethylene oxide may also be usable: general formula:

(where, R and n are the same as what were described above.)

In the above-mentioned phosphoric acid ester salt, if polyoxyethylene group is contained therein, the phosphoric acid ester salt is more soluble in water and the antistatic ability thereof is more excellent than that of higher alcohol phosphoric acid ester salt. Sodium salt may also be used in the form of amine salt. Aforesaid one in the form of triester in not on anion surfactant but is a nonionic surfactant. As phosphoric acid ester salt, phosphoric ester type surfactant sold by General Aniline and Film Co. under the name of 'GAFAC' and their salt may be used.

Further, the group of sulfonic acid salt may also be used besides aforesaid group of phosphoric acid salt. Sulfonic acid salt group includes alkylaryl sulfonic acid salt, amide-condensation-alkylarylsulfonic acid salt, ether-coupling-alkylarylsulfonic acid salt, ester-coupling-alkylarylsulfonic acid salt, olefinsulfonic acid salt, ether-coupling-sulfonic acid salt, amide-coupling-sulfonic acid salt and ester-coupling sulfonate.

Further, the surfactant in the type of Igepon T may also be used. Igepon T has the structure shown below.

Igepon T is characterized in that an amide group is located between a hydrophilic group and a hydrophobic group.

Further, the surfactant in the type of aerosol OT having the following structure may also be used.

This aerosol OT type compound is sulfosuccinic acid di-2-ethylhexylester sodium salt if it is expressed in a chemical nomenclature.

As an anion type surfactant, on the other hand, the one in the form of a copolymer can also be used.

Among surfactants to be used, following copolymer is especially preferable. This copolymer has at least one negative organic group-containing monomer (hereinafter referred to as monomer unit A) as its constituent and a carboxyl group, phosphoric acid residue, sulfonic acid residue and others are given as aforesaid negative organic group, among which the carboxyl group and phosphoric acid residue are preferable and as their salt, there are given ammonium salt and alkali metal salt etc. among which ammonium salt is preferable. As an example of monomer unit A, acrylic acid, methacrylic acid, maleic anhydride and 2-hydroxyethylacryloyl phosphate etc. are given and acrylic acid and maleic anhydride among them are preferable.

As aforesaid negative organic group, a carboxyl group and phosphoric acid residue are preferable and as their salt, ammonium salt is preferable. As monomer unit A, acrylic acid and maleic anhydride are preferable because their preservability and dispersibility are especially excellent.

In the explanation of performance and advantage of the salt of a negative organic group in aforesaid copolymer, a mere negative organic group (e.g. free COOH) and its salt (e.g. ammonium salt, Na salt) are different each other in their dissociation constant.

[dissociation constant K]

The squareness ratio (Bm/Br) of a magnetic recording medium provided with a magnetic layer prepared in the way explained in detail later, with the use of magnetic metal powder whose surface is treated respectively with each copolymer having, as a constituent, monomer unit A having therein each of aforesaid groups, can be improved if a copolymer wherein —COOH is salt is used, compared with the case wherein copolymer having —COOH is merely used. The reason for this is considered to be that, when —COOH is salt, copolymer will not be soluble in the solvent and therefore, copolymer adsorbed on the magnetic metal powder may be hard to be removed and copolymer itself becomes hydrophilic fully, thus the treatment effect is not lost. Further, among aforesaid organic groups, ammonium salt is better than alkali metal salt in its magnetic characteristic and the tendency is that squareness ratio is highest in the case wherein ammonium salt is used and it decreases on the both sides of the highest squareness ratio as the dissociation constant decreases or increases.

As an ammonium salt, the one expressed by the general formula including aforesaid $-COO^-N^+H_4$:

$$-COO^-N^+(R^1)(R^2)(R^3)(R^4)$$

(where, $R^1$, $R^2$, $R^3$ and $R^4$ are hydrogen atom respectively or lower alkyl groups which are identical or different each other) can be applicable. When $R^1$, $R^2$, $R^3$ and $R^4$ mentioned above are a lower alkyl group, it is preferable that the total number of carbon atoms for $R^1 \sim R^4$ is not more than 6 because the basicity of ammonium salt will not be deteriorated by the steric hindrance.

Aforesaid copolymer used in the present invention can be expressed as $-[A]-m-[B]-n$, if it is expressed with the use of aforesaid monomer unit A (expressed even as $-[A]-$) and other monomer unit B (expressed even as $-[B]-$). However, m and n are a positivie real number and an average of (m+n) is not more than 100 and preferably is 50 or less. If it exceeds 100, magnetic metal powder is hard to be dispersed evenly and thereby the performance (e.g. an output or the like) tends to become uneven partially on the recording medium, which is not desirable. Furthermore, (m+n) which is 30 or less is preferable in particular and the dispersion effect under such condition is especially excellent and the peformance of the recording medium related to the present invention is remarkably improved thereby. The average value of (m+n), on the other hand, should preferably be 4 or more from the viewpoint of the prevention of a blooming phenomena.

Now, by selecting each of m and n and also by selecting the type of the salt of a organic group in the unit A, it is possible to control properly both hydrophilic and hydrophobic properties of copolymer, namely to control HLB (Hydrophile Lipophile Balance).

Further, as a monomer unit (hereinafter referred to as monomer unit B) other than the monomer unit A of the copolymer, styrene and styrene derivative such as, for example, styrene, o-methylstyrene, m-methylstyrene, p-methylstyrene, p-ethylstyrene, 2,4-dimethylstyrene, p-n-butylstyrene, p-tert-butylstyrene, p-n-hexylstyrene, p-n-octylstyrene, p-n-nonylstyrene, p-n-decylstyrene, p-n-dodecylstyrene, p-methoxystyrene, p-phenylstyrene, p-chlorostyrene and 3,4-dichlorostyrene are given. As a vinyl type monomer other than the foregoing, there may be given, for example, ethylene type unsaturated monoolefines such as ethylene, propylene, butylene, isobutylene, diisobutylene, isononen and isododecane; vinyhyhalides such as vinyl chloride, vinylidene chloride, vinyl bromide and vinyl fluoride; vinyl acetate; vinyl esters such as vinyl propionate, vinyl benzoate and vinyl butyrate; α-methylene aliphatic monocarboxylic acid esters such as methyl acrylate, ethyl acrylate, n-butyl acrylate, isobutyl acrylate, propyl acrylate, n-octyl acrylate, dodecyl acrylate, 2-ethyl-hexyl acrylate, stearyl acrylate, 2-chloroethyl acrylate, phenyl acrylate, methyl α-chloroacrylate, methyl methacrylate, ethyl methacrylate, propyl methacrylate, n-butyl methacrylate, isobutyl methacrylate, n-octyl methacrylate, dodecyl methacrylate, 2-ethylhexyl methacrylate, stearyl methacrylate, phenyl methacrylate, dimethylaminoethyl methacrylate and diethylaminoethyl methacrylate; acrylic acid or derivatives of methacrylic acid such as acrylonitrile, methacrylonitrile and acrylamide; vinylethers such as vinylmethyl ether, vinylethylether and vinylisobutyl ether; vinyl ketones such as vinylmethylketone, vinylhexylketone and methylisopropenylketone; N-vinyl compound such as N-vinylpyrrole, N-vinylcarbazole, N-vinylindole and N-vinylpyrolidone; and vinylnahthalenes.

Next, preferable ones as aforesaid copolymer (water-soluble polymer) are the ones wherein a monomer unit A in the case of salt of copolymer contains at least two carboxyl groups (aforesaid salt is formed). An example of such monomer unit A is the one wherein two carboxylic groups are held on a principal chain of alkylene as shown in the following constitutional formula. Such monomer unit is preferable from the viewpoint of solubility and dispersibility of copolymer.

(1)

(This unit can be formed under the effect of ammonia with its starting material of maleic acid anhydride. Repeating unit is shown by n; This also applies to the following item.)

(2)

(3)

On the other hand, the preferable ones as a monomer unit B are alkylene, arylalkylene or derivatives thereof and alkylene among them is more preferable. (All these come from alkene or arylalkene.) Especially, alkylene having branches and 4 or more carbon atoms is excellent in its solubility for the organic solvent and it is preferable on the point that it can be kneaded fully with the binder. The starting materials for the preferable monomer unit B are as follows.

(1) isobutylene
(2) 2,3-dimethyl-1-butene
(3) 2,3-dimethyl-1-pentene
(4) isooctane (diisobutylene)
(5) isododecene
(6) isononene Aforesaid copolymer used in the present invention can be made through the copolymerization of aforesaid starting materials. For example, meleic acid anhydride and alkylene are synthesized to be a copolymer and this copolymer is hydrolyzed and thereby a ring is opened for a portion of aforesaid maleic acid anhydride. A carboxyl group thus produced is then subjected to the effect of ammonia and carboxyl groups in monomer unit A are all changed to ammonium salt as mentioned above. In this case, however, a part of maleic acid anhydride portion for which the ring has not been opened for aforesaid hydrolysis may remain. In this case, a ring is opened by the effect of aforesaid ammonia for the portion of meleic acid anhydride and a part of carboxyl groups of monomer unit A is changed to amide while other carboxyl groups are changed to ammonium salt, both leading to a half-amide state, or the ring may not opened for the portion of maleic acid anhydride even by the effect of aforesaid ammonia and the portion of maleic acid anhydride may remain as it is. The extent of ring-opening on aforesaid portion of maleic acid anhydride (i.e. the extent of the change from carboxyl groups in monomer unit A to ammonium salt) can be controlled by the extent of aforesaid hydrolysis. Further, by means of the rate of aforesaid half-amide state or of the portion of maleic acid anhydride, the solubility of the copolymer for water can be controlled. The copolymer obtained, when analyzed with GC/Mass, was identified by the fact that the signal was divided into isooctane and isbutylene, for example, on the portion corresponding to alkene and the signal was divided into toluene, diethylbenzene and styrene etc. or the portion corresponding to acid (e.g. maleic acid anhydride).

In all of the above-exemplified copolymers used in the present invention, the hydrophilic property caused by monomer unit A and the lipophilic property caused by monomer unit B repeatedly appear alternately and therefore, when a portion of monomer unit A is once formed on the surface of magnetic metal powder, a portion of monomer unit B acts effectively in the water medium and thereby the copolymer may not be released. When kneaded with the binder, on the other hand, the portion of monomer unit B has a sufficient dispersibility. The optimum content of copolymer for the magnetic metal powder is 1~20 parts by weight per 100 parts by weight of the magnetic metal powder. If the rate of copolymer is less than aforesaid range, the dispersibility becomes insufficient and if it is more than the range, the strength of the magnetic layer and the recording capability are adversely affected, which is not desirable.

Further, aforesaid liquid-form organic materials used in the present invention include organic solvents exemplified, for example, as ketones such as acetone, methylethylketone, methylisobutylketone and cyclohexanone, etc.; alcohols such as methanol, ethanol, propanol and butanol, etc.; esters such as methyl acetate, ethyl acetate, butyl acetate, ethyl lactate and ethyleneglycolmonoacetate, etc.; ethers such as ethyleneglycoldimethyl ether, diethyleneglycolmonoethyl ether, dioxane and tetrahydrofuran, etc.; aromatic hydrocarbon such as benzene, toluene and xylene, etc. and hydrocarbon halide such as methylenechloride, ethylenechloride, carbon tetrachloride, chloroform and dichlorobenzene, etc.

As an oxidizing gas to be used for drying magnetic metal powder, on the other hand, air and oxygen gas etc. may be used.

Magnetic metal powder treated according to the present invention is then kneaded with binder resins and various kinds of additives under the normal method. Thus, the magnetic paint is produced and it is coated on the suppot and then is dried for the formation of the magnetic layer. After the calendar treatment and slitting step, the magnetic recording medium such as the magnetic tape for example is thus obtained.

In the magnetic recording medium that employs magnetic metal powder of the present invention, it is possible to use as a binder resin for the magnetic layer the polyurethane which may be synthesized through the reaction between polyol and polyisocyanate. As polyol that is usable, there may be given polyester polyol synthesized through the reaction between organic dibasic acid such as phthalic acid, adipic acid, dimerized linolenic acid and maleic acid and glycols such as ethylene glycol, propyleneglycol, butylene glycol and diethylene glycol or polyhydric alcohols such as trimethylolpropane, hexanetriol, glycerol and trimethylolethane or given two or more types of polyol selected from aforesaid glycols and polyhydric alcohols; or lactone type polyester polyol synthesized from lactams such as s-caprolactam, α-methyl-1-caprolactam, s-methyl-s-caprolactam and γ-butyrolactam; or polyether polyol synthesized for ethyleneoxide, propyleneoxide and butyleneoxide etc.

Aforesaid polyol are caused to react on isocyanate compound such as tolylenediisocyanate, hexamethylenediisocyanate, methylenediisocyanate and metaxylilendiisocyanate and thereby polyesterpolyurethane and polyetherpolyurethane both transmuted to urethane and polycarbonatepolyurethane transmuted to carbonate by phosgene and diphenylcarbonate and synthesized.

Aforesaid polyurethanes are normally produced through the reaction mainly between polyisocyanate and polyol and they may be in the form of urethane resin containing free isocyanate group and/or hydroxy group or of urethane prepolymer or they may be in the form containing no reactive terminal group (e.g. the form of urethaneelastomer).

Since the manufacturing method and the cross-linking method for setting for polyurethane, urethaneprepolymer and urethaneelastomer are widely known, the detailed description thereof will be omitted here.

Incidentally, if phenoxy resin and/or vinyl chloride type copolymer are contained in the binder resin together with aforesaid polyurethane, the dispersibility of the magnetic metal powder would be improved and its mechanical strength would be increased when aforesaid binder is applied to the magnetic layer. However, when phenoxy resin and/or vinyl chloride type copolymer only be contained, the layer becomes too hard but this can be prevented by containing urethane.

Phenoxy resin that is usable is a polymer that is expressed by the following general formula and is obtained from the polymerization of bisphenol A and epichlorohydrin.

(in the formula, n ≈ 82~13.)

For example, PKHC, PKHH, PKHJ, etc. made by Union Carbide Corp. are available.

Further, aforesaid vinyl chloride type copolymer that is usable includes the one expressed by the following general formula.

In this case, the mole ratio led from and m in is 95~50 mole% for the former unit and 5~10 mole% for the latter unit. Further, X represents a monomer residue that is capable of copolymerizing with vinyl chloride and also represents at least one kind selected from the group including vinyl acetate, vinyl alcohol, maleic acid anhydride, maleic acid, maleate, vinylidene chloride, acrylonitrile, acrylic acid, acrylic ester, methacrylic acid, methacrylate, vinyl propionate, glycidyl methacrylate and glycidyl acrylate. The preferable polymerization degree expressed as (l+m) is in the range from 100 to 600 and if it is less than 100, the magnetic layer etc. tend to have a tackiness, while if it exceeds 600, the dispersibility deteriorates. Aforesaid vinyl chloride type copolymer may be in the state that it is partially hydrolyzed. Copolymer that contains vinyl chloride—vinyl acetate (hereinafter referred to as copolymer containing vinyl chloride—vinyl acetate) is given as a preferable vinyl type copolymer. Copolymers such as vinyl chloride—vinyl acetate—vinyl alcohol, vinyl chloride—vinyl acetate—maleic acid anhydride and vinyl chloride—vinyl acetate—vinyl alcohol—maleic acid anhydride—maleic acid, are given as an example of vinyl chloride—vinyl acetate type copolymer and partially-hydrolyzed copolymer among vinyl chloride—vinyl acetate type copolymers is preferable. As an actual example of aforesaid vinyl chloride—vinyl acetate type copolymers. 'VAGH', 'VYHH' and 'VMCH' each made by Union Carbide Corp., ESLECM of Sekisui Kagaku Corp. and 'Denka Vinyl 1000G' and 'Denka vinyl 1000W' both made by Denki Kagaku Kogyo Corp. are available and usable.

Aforesaid vinyl chloride type copolymer and phenoxy resin may be used in any combination ratio but the ratio by weight ranging from 90/10 to 5/95 is preferable because it reduces a tackiness of a magnetic layer and enhances squareness ratio.

Regarding the total composition of the binder, on the other hand, the ratio by weight between polyurethane and other resins (total amount of phenoxy resin and vinyl chloride type copolymer) and which ranges from 90/10 to 30/70 is preferable and it has been confirmed that the range of 85/15~35/65 is more preferable. If the amount of polyurethane is too large to be out of aforesaid range, the dispersion failure tends to take place and thereby the still-durability tends to become worse, while if the amount of other resins is too much, the surface property tends to become inferior and the still-characteristic becomes worse.

In the magnetic layer of a magnetic recording medium is also allowed to contain, if occasion demands, carbon black of which the specific surface area $B_1$, (i.e., a BET value), is 40 $m^2/g < B_1 < 200$ $m^2/g$ (hereinafter sometimes called $CB_1$) and carbon black of which the specific surface area $B_2$, (i.e., a BET value), is 200 $m^2/g \leq B_2 < 500$ $m^2/g$ (hereinafter sometimes called $CB_2$). Carbon blacks $CB_2$ including, for example, Conductex 975 whose specific surface area is 270 $m^2/g$ and particle size is 46 mμ, and conductex 950 whose specific surface area is 245 $m^2/g$ and particle size is 46 mμ, both manufactured by Columbia Carbon Co., Cabot Vulcan XC-72 whose specific surface area is 257 $m^2/g$ and particle size is 18 mμ manufactured by Cabot Co., and the like can be used. Carbon blacks $CB_1$ including, for example, Raven 2000 whose specific surface area is 180 $m^2/g$ and particle size is 19 mμ, 2100, 1170 and 1000 each manufactured by Columbia Carbon Co.; #100, #75, #44, #40, #35 each manufactured by Mitsubishi Chemical Co., and the like can be used.

Figure 1:
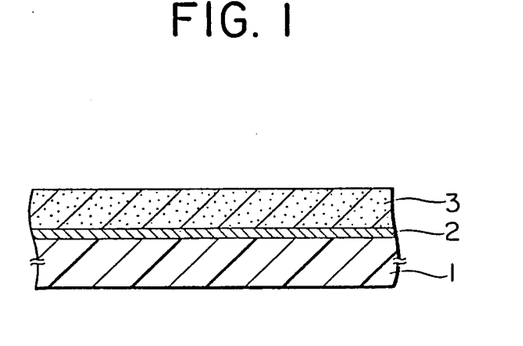
FIG. 1 and FIG. 2 show the cross-sectional view of two examples of a magnetic recording medium prepared with the use of magnetic metal powder processed according the present invention. In the figures, '1' represents the support and '3' represents the magnetic layer.

FIG. 1 illustrates a magnetic recording, media such as a magnetic tape in which magnetic metal powder of the invention is used. In this drawing, a subbing layer 2 which is sometimes not provided according to circumstances and a magnetic layer 3 are laminated on a support 1, and according to the invention the magnetic layer 3 contains the abovedescribed treated magnetic metal powder.

As for the binder resins of the magnetic layers, it is allowed to use, besides the aforementioned binder resins, the mixtures of the binder resins and a thermoplastic resin, a thermosetting resin, a reactive resin, or an electrosetting resin.

Such thermoplastic resins to be used are of the order of the softening degree of not higher than 150° C., average molecular weight of from 10,000 to 200,000 and polymerization degre of from about 200 to 2,000, and they include, for example, an epoxy or phenoxy fatty acrylic acid ester-acrylonitrile copolymer, acrylic acid ester-vinylidene chloride copolymer, acrylic acid ester-styrene copolymer, methacrylic acid ester-acrylonitrile copolymer, methacrylic acid ester-vinylidene chloride copolymer, methacrylic acid ester-styrene copolymer, polyvinyl fluoride, vinylidene chloride-acrylonitrile copolymer, acrylonitrile-butadiene copolymer, polyamide resin, polyvinyl butyral, styrene-butadiene copolymer polyester resin, chlorovinylether-acrylic acid ester copolymer, amino resin, various synthetic rubber type thermoplastic resins and the mixtures thereof.

These resins are described in Japanese Patent Examined Publication Nos. 6877/1962, 12528/1964, 19282/1964, 5349/1965, 20907/1965, 9463/1966, 14059/1966, 16985/1966, 6428/1967, 11621/1967, 4623/1968, 15206/1968, 2889/1969, 17947/1969, 18232/1969, 14020/1970, 14500/1970, 18573/1972, 22063/1972, 22064/1972, 22068/1972, 22069/1972, 22070/1972, and 27886/1973; and U.S. Pat. Nos. 3,144,352, 3,419, 420, 3,499,789 and 3,713,887.

Such thermosetting or reactive resins are of a molecular weight of not more than 200,000 in a coating liquid state, and the molecular weight thereof become infinitive by the reaction of condensation or addition after coating was dried. Among them, the preferable ones are those not softened or not fused by the time when they are thermally cracked. Such preferred ones include typically phenol resin, epoxy resin, urea resin, melamine resin, alkyl resin, silicone resin, acryl type reactive resin, a mixture of a methacrylate copolymer and a diisocyanate prepolymer, ureaformaldehyde resin, polyamine resin and the mixtures thereof.

These resins are described in Japanese Patent Examined Publication Nos. 8103/1964, 9779/1965, 7192/1966, 8016/1966, 14275/1966, 18179/1967, 12081/1968, 28023/1969, 14501/1970, 24902/1970, 13103/1971, 22067/1972, 22072/1972, 22073/1972, 28045/1972, 28048/1972 and 28922/1972, and U.S. Pat. Nos. 3,144,353, 3,320,090, 3,437,510, 3,597,273, 3,781,210 and 3,781,211.

The electrosetting resins include, for example, unsaturated prepolymers such as those of anhydrous maleic acid type, urethane acryl type, polyester acryl tape, polyether acryl type, polyurethane acryl type, polyamide acryl type and the like types, and the polyfunctional monomers include, for example, those of ether acryl type, urethane acryl type, phosphoric acid ester acryl type, aryl type, hydrocarbon type and the like types.

It is preferred from the viewpoints of recording density, strength and the like that an aggregate amount of binders to be used in the invention is to be from 5 to 50 parts by weight per 100 parts by weight of magnetic metal powder.

Also, a variety of setting agents may be contained in a magnetic layer so as to improve the durability of a magnetic recording medium. For example, isocyanate may be contained therein.

Useful aromatic isocyanates include, for example, tolyl diisocyanate (TDI), 4,4'-diphenylmethane diisocyanate (MDI), xylylene diisocyanate (XDI), methoxylylene diisocyanate (MXDI), and the addition products of the above-mentioned isocyanates and active hydrogen compounds. The suitable average molecular weight thereof is within the range between 100 and 3000.

The typical isocyanates include, for example. 'Sumizyl' T80, 44S, PF, and L manufactured by Sumitomo-Bayer Urethane Co.; 'Desmodule' T65, R, RF, IL and SL manufactured by Nippon Polyurethane Co.; 'Takenate' 300S and 500 manufactured by Takeda Chemical Industries, Ltd.; 'NDI' and 'TODI' manufactured by Mitsui-Nisso Urethane Co.; 'Desmodule' T100, 'Millionate' MR and MT, 'Coronate' L manufactured by Nippon Polyurethane Co.; and 'PAPI' 135, 'TDI' 65, 80 and 100, and 'Isonate' 125M and 143L, manufactured by Kasei-Up John Co.; and the like.

On the other hand, aliphatic isocyanates include, for example, hexamethylene diisocyanate (HMDI), lysine isocyanate, trimethylhexamethylene diisocyanate (TMDI), addition products of the above-mentioned isocyanates and active hydrogen compounds, and the like. Among these aliphatic isocyanates and addition products of these isocyanates and active hydrogen compounds, the preferred ones are those having molecular weight within the range of from 100 to 3000.

In the meanwhile, among the aliphatic isocyanates, nonalicyclic isocyanates and the addition products of these compounds and active hydrogen compounds.

There are the typical examples thereof, such as 'Sumidule' N, and 'Desmodule' Z4273, manufactured by Sumitomo-Bayer Urethane Co.; 'Duranate' 50M, 24A-100 and 24A-90CX manufactured by Asahi Kasei Co.; 'Coronate' HL manufactured by Nippon Polyurethane Co.; 'TMDI' manufactured by Hüls Co.; and the like.

The alicyclic isocyanates, among the aliphatic isocyanates, include, for example, methylcyclohexane-2,4-diisocyanate having the following formula;

4,4'-methylenebis(cyclohexyl isocyanate) having the following formula;

isophoronediisocyanate, and the addition products of the active hydrogen compounds thereof.

The typical examples thereof include 'IPDI' T1890, H2921, B1065 and the like manufactured by Hüls Chemical Co.

A magnetic recording medium is prepared in such a manner that a magnetic paint is prepared by mixedly dispersing magnetic powders, binders and various additives in an organic solvent, and the resulted paint is added with the aforementioned aromatic isocyanate and/or aliphatic isocyanate, and the resulted material is coated onto a support such as a sheet of polyester film, and then dried up if required.

For the purposes of keeping the physical properties of a magnetic paint ready to coat and improving the physical properties of a magnetic layer to be formed it is preferred to use an aromatic isocyanate jointly with an aliphatic isocyanate.

The amount of isocyanates to be added is from 1 to 100% by weight to binders. If the amount thereof is not more than 1% by weight, a magnetic layer is apt to be set unsatisfactorily, and even if it should be set it is apt to become sticky. In order to obtain a further preferable magnetic layer, such isocyanate is to be preferably added in an amount of from 5 to 30% by weight to binders.

To the paints used for forming the above-mentioned magnetic layer are also allowed to contain such additives as a dispersing agent, a lubricant, an abrasive, an antistatic agent and the like.

As for such dispersing agents which may be used, there may be given, for the example, fatty acids each having 8 to 18 carbon atoms, represented by R—COOH in which R is a saturated or unsaturated alkyl group having 7 to 17 carbon atoms, such as soybean lecithin, lecithin not containing soybean oil, caprylic acid, capric acid, lauric acid, myristic acid, palmitic acid, stearic acid, oliec acid, elaidic acid, linolic acid, linolenic acid and the like; and metal soaps comprising alkali metals such as Li, Na, K and the like alkaline earth metals such as Mg, Ca, Ba and the like each of the above-mentioned fatty acid. Besides the above, higher alcohol having not less than 12 carbon atoms and sulfuric acid esters may also be used. Further, any ordinary surface active agents being marketed may be used. These dispersing agents can be used independently or in combination. As for such lubricants, there can be used silicone oil, graphite, molybdenum disulfide, tungsten disulfide, a fatty acid ester comprising a monobasic fatty acid having 12 to 16 carbon atoms and a monovalent alcohol having aggegate carbon atoms amount to 21 to 23 by adding the carbon atoms of the fatty acid, and the like. These lubricants each may be added in an amount within the range of 0.2 to 20 parts by weight per 100 parts of magnetic powder.

Such abrasives as may be used are materials being publicly used including, for example, fused alumina, silica carbide, chromium oxide, corundum, artificial corundum, diamond, artificial diamond, garnet, emery comprising mainly corundum and magnetite, and the like. These abrasives are used in an average particle size of 0.05 to 5μ and preferably in particular 0.1 to 2μ. The amount of these abrasives added is within the range of 1 to 20 parts by weight per 100 parts by weight of magnetic powder.

As for such antistatic agents which may be used, there include, for example, such an electroconductive powder as carbon black, graphite, a tin oxide-antimong oxide compound, and the like; such a natural surface active agent as saponin; such a nonionic surface active agent as those of an alkyloxide, glycerol, or glycidol, and the like; such a cationic surface active agent as a higher alkylamine, a quaternary ammonium salt, pyridine and other heterocyclic compounds, a phosphonium or sulfonium, and the like; an anionic surface active agent containing such an acid group as those of carboxylic acid, sulfonic acid, phosphoric acid, a sulfuric acid ester, a phosphoric acid ester and the like; such an amphoteric surface active agent as an amino acid, aminosulfonic acid, a sulfuric acid ester of aminoalcohol or a phosphoric acid ester thereof; and the like.

Solvents of a magnetic paints or solvents to be used when a magnetic paint is coated on may be acetone, methylethyl ketone or the like.

As for the materials of a support, there uses such a polyester as polyethylene terephthalate, polyethylene-2,6-naphthalate and the like; such a polyolefin as polypropylene and the like; such a cellulose derivative as cellulose triacetate, cellulose diacetate and the like; such a plastic as polycarbonate and the like; such a metal as Al, Zn and the like; such a ceramic as glass-boron nitride, silicon carbide, porcelain, earthware and the like.

The thickness of these supports are within the order of from about 3 to 100 μm and preferably from 5 to 50 μm in the case of film or sheet type supports, and within the order of from 30 μm to 10 mm in the case of disc or card type supports. In the case of drum type supports, the support made in a cylindrical shape and the shape is determined according to recorders used.

Figure 2:
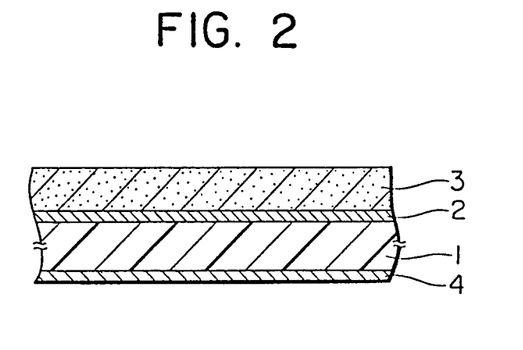

For the purposes of preventing electrostatic charges and image transfers, it is preferred to provide such a backcoat 4 as shown in FIG. 2 onto a support surface opposite to the surface coated with a magnetic layer.

As for the coating methods of coating the magnetic paint onto a support so as to form a magnetic layer, there can utilize such a method as that of an air-doctor coating, blade coating, air-knife coating, squeeze coating, impregnation coating, reverse-roll coating, transfer-roll coating, gravure coating, kis coating, cast coating, spray coating or the like, and the other methods may also be used.

A magnetic layer which was coated onto a support in the above-mentioned methods is treated if required to orient the magnetic powder in the layer and is then dried.

If occasion demands, the magnetic layer is treated to smooth the surface thereof or is cut into a desired shape so as to produce a magnetic recording medium.

Now, the invention will be described with reference to some typical examples.

The components, proportion, order of procedures and the like may be changed variously without departing from the sprit or essential characteristics of the invention.

In the examples give below, the term, 'part' means 'part by weight'.

EXAMPLE 1

In this example, 1028 g of surface-treated magnetic metal powder were obtained in such a manner that 1 kg of needle-shaped magnetic iron powder having coercivity of 1450 Oe, δs of 129 emu/g and specific surface area of 44 m$^2$/g, 30 g of 'Duomine' TDO manufactured by Lion Fat and Oil Co., Ltd., and 2000 g of toluene were put in a 10 liter separable-flask with a dissolver, and the resulted mixture was stirred up for 1.5 to 2 hours in an atmosphere of nitrogen, and the solvents were distilled off in a vacuum distillation process and nitrogen was then added again to repeat the vacuum distillation.

Of the magnetic properties of this magnetic metal powder which was surface-treated, Hc was 1430 Oe, and δs was 127 emu/g, and the bulk density in particular was high. When a portion of the powder was tried to float on water, it was found that most of them were floated on water and were become hydrophobic.

This treated magnetic metal powder was put in a 10 liter separable-flask in an atmosphere of nitrogen and 1500 g of toluene were added to soak the powder therein and an agitation was applied for half an hour. Next, the powder was taken out to the air and was put thinly in a tray to dry up by air gradually. Thus, 1025 g of dried and treated magnetic metal powder were obtained.

Of the magnetic properties of this magnetic metal powder, Hc was 1390 Oe, and δs was 1240 emu/g. This powder is referred to as P-1.

Three other samples were obtained in the same manner and conditions of treating magnetic iron powder, except that the above-mentioned soaking solvent was replaced by xylene, methanol and ethanol, respectively. These are referred to as P-2, P-3 and P-4, respectively.

Only a surface-treatment was applied to 1 kg of the same magnetic iron powder as those mentioned above and no soaking was made in solvent. The magnetic iron powder thus obtained is referred to as P-5.

Same magnetic iron powder was not surface-treated but was soaked in toluene, filtrated, allowed to stand in the air and dried up. The magnetic powder sample thus obtained is referred to as P-6.

Magnetic metal powders, P-1 through P-6, prepared as described above were dispersed in the following process, respectively:

First, the following components were made ready to use:

| | |
|---|---|
| Magnetic powder (P-1 to P-6) | 500 parts ea. |
| VAGH mfd. by Union Carbide Co. | 56 parts |
| Estane mfd. by Goodrich Co. | 56 parts |
| Lecithin | 13 parts |
| Lubricating agent | 15 parts |
| Cyclohexanone | 655 parts |
| Methylethyl ketone | 140 parts |
| Toluene | 140 parts |

Each set of the above-mentioned components was dispersed by putting them in a ball mill to prepare the respective paints, and each of the paints was then filtrated by making use of a 1 μm filter and was further added with 10 parts of polyfunctional isocyanate. Each of the resulted coating liquids were so coated on a support surface by a reverse roll coater while an orientation was applied at 2500 Gauss so that the coating thickness was 3 μm, and each of the resulted materials was treated by a super-calender. Thus, the tapes were prepared, respectively. The tapes were called T-1 through T-6 respectively corresponding to the above-mentioned magnetic powders P-1 through P-6.

The magnetic properties and the C/N, i.e., the carrier to noise ratio, at 5 MHz thereof are shown in Table 1. Also, for inspecting the physical properties of these coating liquids, dispersion liquids without containing isocyanate were sampled, and the comparison of the differences was made between those immediately after they were dispersed and those after a whole day and night, in terms of the viscosity, gloss obtained when coated on a polyethyleneterephthalate base by an applicator, and squareness ratio obtained when a magnetic field was applied. The data thereof are shown in Table 2.

It can be found from the data shown in Table 1 and Table 2 that the properties of T-1 through T-4 according to the invention are superior to T-5 and T-6.

TABLE 1

| Tape | Hc(Oe) | Squareness ratio | C/N (5 MHz) |
|---|---|---|---|
| T-1 (Invention) | 1430 | 0.80 | +1.5 |
| T-2 (Invention) | 1430 | 0.79 | +1.0 |
| T-3 (Invention) | 1430 | 0.79 | +1.5 |
| T-4 (Invention) | 1430 | 0.79 | +1.0 |
| T-5 (Comparative) | 1430 | 0.73 | −1.5 |
| T-6 (Comparative) | 1420 | 0.76 | −0.5 |

TABLE 2

| | Immediately after dispersion/ After poise (for 24 hrs.) | | |
|---|---|---|---|
| Coating Liquid | Hc(Oe) | Squareness ratio | viscosily (poise) |
| T-1 (Invention) | 101/102 | 0.80/0.80 | 23/21 |
| T-2 (Invention) | 100/98 | 0.80/0.79 | 21/20 |
| T-3 (Invention) | 102/100 | 0.79/0.79 | 19/18 |
| T-4 (Invention) | 101/100 | 0.79/0.77 | 20/18 |
| T-5 (Comparative) | 84/63 | 0.74/0.73 | 25/40 |
| T-6 (Comparative) | 90/80 | 0.76/0.74 | 30/33 |

EXAMPLE 2

In the same process as that in Example 1, the surface active agent was replaced by Orotane, i.e., an ammonium salt of the aforementioned copolymers, and the solvent was replaced by methanol. Applying the same dipping process, the dipping treated magnetic powder was obtained after the surfaces thereof were treated. These powders were called P-7 through P-12. P-11 was that in which only the surface treatment was applied but no dipping process was not applied; and P-12 was not surface-treated but was dipped in methanol and then dried up in air.

Magnetic powders P-7 to P-12 prepared in the above-mentioned procedures were dispersed in the following formula. First, the following components were made ready to use;

| | | |
|---|---|---|
| Magnetic powders (P-7 to P-12) | 500 | parts each |
| Phenoxy resin (mfd. by Union Carbide Co.) | 56 | parts |
| Estane 5701 (mfd. by Goodrich Co.) | 56 | parts |
| Lecithin | 13 | parts |
| Lubricating agent | 15 | parts |
| Cyclohexanone | 655 | parts |
| Methylethyl ketone | 140 | parts |
| Toluene | 140 | parts |

The above-mentioned components were treated by a ball mill in the same manner as in Example 1 to make the tape T-7 to T-12, respectively.

The magnetic properties and C/N at 5 MHz there of are shown in Table 3. For inspecting the physical properties of the coating liquids, dispersion liquids without containing isocyanate were sampled, and the comparison of the differences was made between those immediately after they were dispersed and those after 24-hours, in terms of the viscosity, gloss obtained when the dispersion liquid was coated on a polyethyleneterephthalate base by making use of an applicator, and squareness ratio obtained when a magnetic field was applied. The data thereof are shown in Table 4.

TABLE 3

| Tape | Hc(Oe) | Squareness ratio | C/N (5 MHz) |
|---|---|---|---|
| T-7 (Invention) | 1440 | 0.81 | +2.5 |
| T-8 (Invention) | 1430 | 0.79 | +1.0 |
| T-9 (Invention) | 1430 | 0.80 | +1.5 |
| T-10 (Invention) | 1430 | 0.80 | +1.5 |
| T-11 (Comparative) | 1420 | 0.72 | −2.5 |
| T-12 (Comparative) | 1420 | 0.74 | −2.0 |

TABLE 4

| | Immediately after dispersion/ After poise (for 24 hrs.) | | |
|---|---|---|---|
| Coating Liquid | Hc(Oe) | Squareness ratio | viscosily (poise) |
| T-7 (Invention) | 105/103 | 0.82/0.81 | 26/29 |
| T-8 (Invention) | 102/101 | 0.81/0.80 | 19/21 |
| T-9 (Invention) | 100/101 | 0.80/0.79 | 17/25 |
| T-10 (Invention) | 103/102 | 0.82/0.81 | 20/21 |
| T-11 (Comparative) | 65/42 | 0.73/0.70 | 35/63 |
| T-12 (Comparative) | 70/65 | 0.75/0.71 | 30/45 |

It can be found from Table 3 and Table 4 that the properties of T-7 to T-10 according to the invention are superior to T-11 and T-12.

EXAMPLE 3

Each of the tapes T-13 to T-18 was prepared in the same process as in Example 1, except that the surface active agent was replaced by oleic acid. The properties of each of the tapes are shown in Table 5 and Table 6, respectively, from which it can be found that the magnetic powders T-13 to T-16 according to the invention are superior.

TABLE 5

| Tape | Hc(Oe) | Squareness ratio | C/N (5 MHz) |
|---|---|---|---|
| T-13 (Invention) | 1430 | 0.79 | +1.5 |
| T-14 (Invention) | 1440 | 0.78 | +2.0 |
| T-15 (Invention) | 1430 | 0.80 | +1.5 |
| T-16 (Invention) | 1430 | 0.79 | +1.5 |
| T-17 (Comparative) | 1390 | 0.70 | −2.0 |
| T-18 (Comparative) | 1400 | 0.73 | −2.5 |

TABLE 6

| | Immediately after dispersion/ After poise (for 24 hrs.) | | |
|---|---|---|---|
| Coating Liquid | Hc(Oe) | Squareness ratio | viscosily (poise) |
| T-13 (Invention) | 102/101 | 0.78/0.79 | 31/29 |
| T-14 (Invention) | 100/98 | 0.81/0.80 | 27/26 |
| T-15 (Invention) | 105/103 | 0.79/0.78 | 29/35 |
| T-16 (Invention) | 102/101 | 0.78/0.77 | 23/27 |
| T-17 Comparative) | 62/35 | 0.72/0.69 | 29/65 |
| T-18 (Comparative) | 75/60 | 0.74/0.71 | 40/55 |

What is claimed is:

1. A process for treating a magnetic metal powder comprising
   (a) treating the surface of said magnetic metal powder with an alkylamine fatty acid,
   (b) then steeping said magnetic powder in an organic liquid, and
   (c) then drying said magnetic powder in the presence of an oxidative gas.

2. A process for treating a magnetic metal powder comprising
   (a) treating the surface of said magnetic metal powder with a surfactant in an inert atmosphere,
   (b) then steeping said magnetic metal powder in an organic liquid, and
   (c) then drying said magnetic metal powder in the presence of an oxidative gas.

3. The process of claim 1, wherein said surfactant is an anionic surfactant or cationic surfactant.

4. The process of claim 3, wherein said anionic surfactant is selected from the group consisting of the salts of phosphoric esters, sulfonate compounds, carboxylate compounds, and copolymers containing a monomer unit having at least one anionoid organic group and other monomer unit.

5. The process of claim 3 wherein said surfactant is taken from the class consisting of alkylamine fatty acids, salts of phosphoric acids, and salts of sulfonate compounds.

6. The process of claim 5, wherein said salt is ammonium salt.

7. The process of claim 3, wherein said cationic surfactant is an alkylamine fatty acid.

8. The process of claim 2, wherein said organic liquid is selected from the group consisting of ketones, alcohols, esters, ethers, hydrocarbon halide compounds, benzene, toluene and xylene.

9. The process of claim 2, wherein said oxidative gas is oxygen or air.

10. The process of claim 2, wherein said magnetic metal powder is selected from the group consisting of Fe, Ni, Co. Fe-Ni-Co alloy, Fe-Mn-Zn alloy, Fe-Ni-Zn alloy, Fe-Co-Ni-Cr alloy, Fe-Al alloy, Fe-Co-Ni-P alloy, and Co-Ni alloy.

11. A magnetic recording medium comprising a support and a magnetic recording layer containing a magnetic metal powder and a binder, wherein said magnetic metal powder is pre-treated by
    (a) treating the surface of said magnetic metal powder with a surfactant in an inert atmosphere,
    (b) then steeping said magnetic metal powder in an organic liquid, and
    (c) then drying said magnetic metal powder in the presence of an oxidative gas.

12. The magnetic recording medium of claim 11, wherein said magnetic metal powder is selected from the group consisting of Fe, Ni, Co, Fe-Ni-Co alloy. Fe-Mn-Zn alloy, Fe-Ni-Zn alloy, Fe-Al alloy Fe-Co-Ni-Cr alloy, Fe-Co-Ni-P alloy, and Co-Ni alloy.

13. The magnetic recording medium of claim 11, wherein said surfactant is an anionic surfactant or cationic surfactant.

14. The magnetic recording medium of claim 13, wherein said anionic surfactant is selected from the group consisting of the salts of phosphoric esters, sulfonate compounds, carboxylate compounds, and copolymers containing a monomer unit having at least one anionoid organic group and other monomer unit.

15. The magnetic recording medium of claim 11, wherein said binder comprises a polyurethane resin and a phenoxy resin.

16. The magnetic recording medium of claim 11, wherein said magnetic recording layer contains one or more additives selected from the group consisting of carbon black, dispersants, lubricants, antistatic agents, and abrasive agents.

17. The magnetic recording medium of claim 11, wherein said magnetic recording medium has a backing coat layer.

* * * * *